US008687750B1

(12) United States Patent
Lee et al.

(10) Patent No.: US 8,687,750 B1
(45) Date of Patent: Apr. 1, 2014

(54) SIGNAL DETECTION WITH ADJUSTABLE NUMBER OF INTERFERING SIGNALS

(75) Inventors: Jungwon Lee, San Diego, CA (US); Jiwoong Choi, Sunnyvale, CA (US); Yakun Sun, Sunnyvale, CA (US)

(73) Assignee: Marvell International Ltd. (BM)

( * ) Notice: Subject to any disclaimer, the term of this patent is extended or adjusted under 35 U.S.C. 154(b) by 233 days.

(21) Appl. No.: 13/159,931

(22) Filed: Jun. 14, 2011

Related U.S. Application Data

(60) Provisional application No. 61/358,597, filed on Jun. 25, 2010.

(51) Int. Cl.
*H03D 1/04* (2006.01)

(52) U.S. Cl.
USPC ........... 375/346; 375/341; 375/148; 375/340; 455/137

(58) Field of Classification Search
USPC ........... 375/346, 341, 148, 340, 347; 455/137
See application file for complete search history.

(56) References Cited

U.S. PATENT DOCUMENTS

| | | | |
|---|---|---|---|
| 7,209,522 B1 | 4/2007 | Shirali | |
| 7,616,695 B1 | 11/2009 | Sarrigeorgidis | |
| 7,848,218 B2 | 12/2010 | Lee et al. | |
| 2007/0183483 A1* | 8/2007 | Narayan et al. | 375/148 |
| 2007/0248151 A1* | 10/2007 | Kim et al. | 375/148 |
| 2008/0153440 A1* | 6/2008 | Rhee et al. | 455/137 |
| 2009/0304116 A1* | 12/2009 | Challa et al. | 375/340 |
| 2011/0051858 A1* | 3/2011 | Salvekar et al. | 375/341 |

OTHER PUBLICATIONS

Ece Gelal, et al, "Topology Control for Effective Interference Cancellation in Multi-User MIMO Networks", University of California, IEEE INFOCOM 2010, (9 pgs).
Christian Mehlführer, et al, Research Article "Experimental Evaluation of Adaptive Modulation and Coding in MIMO WiMAX with Limited Feedback", Hindawi Publishing Corporation, EURASIP Journal on Advances in Signal Processing, vol. 2008, Article ID 837102, Jun. 22, 2007,(12 pgs).
Georgios K. Psaltopoulos, et al, "Generalized MMSE Detection Techniques for Multipoint-to-Point Systems", IEEE GLOBECOM 2006 Proceedings (5 pgs).
Seung-Hwan Lee, et al, "Wireless Systems: Complexity Reduced Space ML Detection for Other-Cell Interference Mitigation in SIMO Cellular Systems", School of Electrical Engineering and INMC, Seoul National University, Seoul, KR, European Transactions on Telecommunications, Eur. Trans. Telecoms. 2011; 22:51-60, Published online Jan. 7, 2011 in Wiley Online Library (10 pgs).

* cited by examiner

*Primary Examiner* — Eva Puente

(57) ABSTRACT

Systems, methods, and other embodiments associated with signal detection with an adjustable number of interfering signals. According to one embodiment an apparatus includes an interferer counter, a detection method selector, and a signal detector. The interferer counter is configured to identify a number of active interfering signals in a received signal. The detection method selector is configured to select a signal detection method based, at least in part, on the number of active interfering signals identified by the interferer counter. The signal detector is configured to process the received signal according to the signal detection method selected by the detection method selector to detect an intended signal in the received signal.

18 Claims, 4 Drawing Sheets

US 8,687,750 B1

SIGNAL DETECTION WITH ADJUSTABLE NUMBER OF INTERFERING SIGNALS

CROSS REFERENCE TO RELATED APPLICATIONS

This application claims the benefit of U.S. provisional application Ser. No. 61/358,597 filed on Jun. 25, 2010, which is hereby wholly incorporated by reference.

BACKGROUND

Multiple Input Multiple Output (MIMO) systems are becoming popular in wireless communications to leverage aspects of intersymbol interference to potentially increase the bandwidth efficiency of existing spectra. In wireless communication, radio waves do not propagate in a straight line between the transmitter and receiver, but rather bounce and scatter randomly off objects in the environment. This scattering, known as multipath, results in multiple copies of the transmitted signal arriving at the receiver via different scatter paths. MIMO leverages multipath to enhance transmission accuracy and allow multiple signals to be broadcast at the same frequency. This is done by treating the multiple scatter paths as separate parallel sub channels, each capable of bearing distinct data.

MIMO operates by splitting a discrete outbound signal into multiple substreams using an array of transmitter antennas to simultaneously launch the parallel substreams. The outbound signal may be de-multiplexed into a number of parallel data streams or multiple copies of the outbound signal may be transmitted by the antennas. All the substreams are transmitted in the same frequency band, so spectrum is efficiently utilized. Another array of antennas in the receiving device, is used to pick up the multiple transmitted substreams and their scattered signals. Each receive antenna picks up all of the incident transmitted substreams superimposed as observed components of the received signal vector, not separately. However, the multiple substreams are all scattered slightly differently, since they originate from different transmit antennas that are located at different points in space. These scattering differences allow the substreams to be identified and recovered from the observed components of the received signal vector.

While MIMO facilitates efficient utilization of spectrum, it presents additional challenges in detecting the signal substreams intended for a given receiving device. For example, signals intended for other receiving devices may be broadcast simultaneously or nearly simultaneously in the same frequency band by the same transmitter array. In addition, neighboring transmitter arrays also transmit in the same frequency band.

SUMMARY

In one embodiment an apparatus includes an interferer counter, a detection method selector, and a signal detector. The interferer counter is configured to identify a number of active interfering signals in a received signal. The detection method selector is configured to select a signal detection method based, at least in part, on the number of active interfering signals identified by the interferer counter. The signal detector is configured to process the received signal according to the signal detection method selected by the detection method selector to detect an intended signal in the received signal.

In another embodiment, a method includes determining a number of active interfering signals in a received signal and selecting a detection method based, at least in part, on the number of active interfering signals. The method also includes processing the received signal according to the selected detection method to detect an intended signal in the received signal.

In another embodiment, a device includes a transmitter/receiver antenna array configured to receive a plurality of signal streams combined with interfering signals that together form a received signal. The device also includes a baseband processor configured to determine a number of active interfering signals based, at least in part, on the received signal; to select a detection method based, at least in part, on the number of active interfering signals; and to process the received signal according to the selected detection method to detect the intended signal in the received signal.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Described herein are example systems, methods, and other embodiments associated with signal detection with an adjustable number of interfering signals. The efficacy with which many signal detection techniques can isolate a given signal from among interfering signals is often dependent on the number of interfering signals. The number of inter-cell and intra-cell interfering signals is not typically known to a mobile device. This may lead to the use of more computationally intense signal detection methods that do not rely on a priori knowledge of the number of interfering signals.

Figure 1:
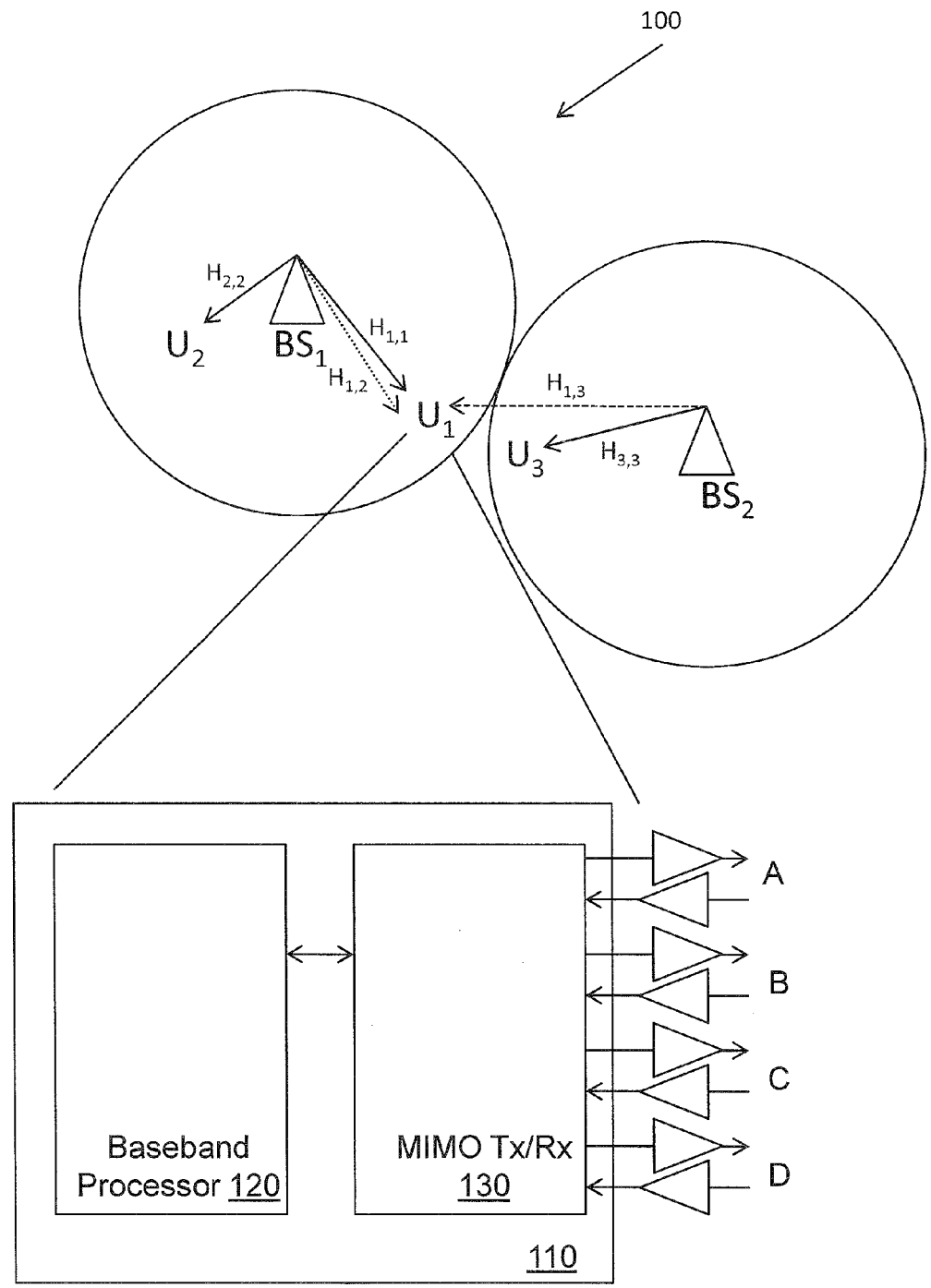
FIG. 1 illustrates a schematic diagram of an example MIMO communication system depicting multiple base stations and multiple receiving devices.

The systems and methods described herein identify a number of active interfering signals in a received signal and select a signal detection method that is tailored to that specific number of interfering signals. Knowledge of the number of interfering signals may allow a simpler signal detection technique to be used. Actively determining the number of interfering signals at any given time also allows different signal detection methods to be selected for different instances of signal data as interfering signals appear and disappear FIG. 1 illustrates an example multiuser Multiple Input Multiple Output communication system 100. Three mobile devices (e.g., mobile devices that communicate data by way of radio transmissions) U1, U2, and U3 are presently interfacing with the system 100. The system 100 includes two base stations (e.g., cellular telephone transmitter/receivers towers) $BS_1$ and $BS_2$. An approximate boundary for each base station's range, referred to as the base stations "cell", is shown as a circle surrounding the base station. While the systems and methods herein will be described in the context of a multiuser MIMO environment, the systems and method may be used in any communication system in which a signal detection technique can be selected given the potential existence of a number of interfering signals in a received signal.

Base station $BS_1$ is communicating with mobile device $U_1$ by way of an effective channel $H_{1,1}$. The effective channel $H_{1,1}$ describes the communication link or signal path between $BS_1$ and $U_1$. The effective channel represents the combined effect of signal deflection due to obstacles (hills, walls, and so on), scattering, fading, and power decay due to the distance between $BS_1$ and $U_1$. If $U_1$ is in motion, the effective channel will be constantly changing. Further, other obstacles in the signal path that affect the channel may be moving. Thus, information about the current state of the effective channel of a given mobile device is typically either transmitted to or determined by a base station so that the base station can adapt transmissions to current channel conditions. Likewise, the mobile device adapts its reception based on current channel conditions.

One way to estimate the instantaneous effective channel between a mobile device and a base station is for the mobile device to transmit a pilot sequence that is known to all base stations. The base station can determine the effective channel based on characteristics of the pilot sequence when it is received by the base station. The pilot signal can be inserted in predetermined positions in frames of data-carrying signals from the mobile device.

Referring again to FIG. 1, $BS_1$ is also communicating with $U_2$ by way of effective channel $H_{2,2}$. The signal being transmitted to $U_2$ may interfere with the signal being transmitted to $U_1$. This intra-cell interfering signal travels along effective channel $H_{1,2}$ to $U_1$. If $BS_1$ is transmitting to $U_1$ and $U_2$ at the same time and using the same frequency band, $U_1$ will detect that this signal has traveled along a different effective channel and will typically employ one or more signal detection methods to filter the effects of the interfering signal. Because many modern wireless communication systems have adjacent cells transmitting in the same frequency bands, mobile devices are also subject to inter-cell interference. $BS_2$ is exchanging signals with $U_3$ by way of effective channel $H_{3,3}$. This signal also interferes with the signal being transmitted by $BS_1$ to $U_1$. In addition to the signal on effective channel $H_{1,2}$, U1 will need to filter the signal from $BS_2$ on effective channel $H_{1,3}$.

One embodiment of a wireless signal processing unit 110 is shown in FIG. 1. The wireless signal processing unit 110 is part of the mobile device $U_1$. The wireless signal processing unit 110 includes a MIMO Transmitter/Receiver radio 130. The radio 130 includes four antennas that are configured to receive the multiple signal streams discussed in the Background. The radio 130 provides these streams to a baseband processor 120. The baseband processor 120 combines the multiple signal streams and also performs signal detection and/or filtering based on information about the effective channels of the signal streams to estimate an intended signal meant for the particular mobile device $U_1$. The estimated intended signal is demodulated into data and provided to other components on the mobile device.

In general and in some embodiments, the signal processing unit 110 from FIG. 1 may be implemented on a chip including one or more integrated circuits configured to perform one or more of the functions described herein. The signal processing unit 110 may be implemented in a computing device, for example, a computer, a laptop, a server, a cell phone, a hand held computing device, or other type of device that uses memory. The baseband processor 120 may be part of the same device as the signal processing unit 110 or may be external to the apparatus.

Figure 2:
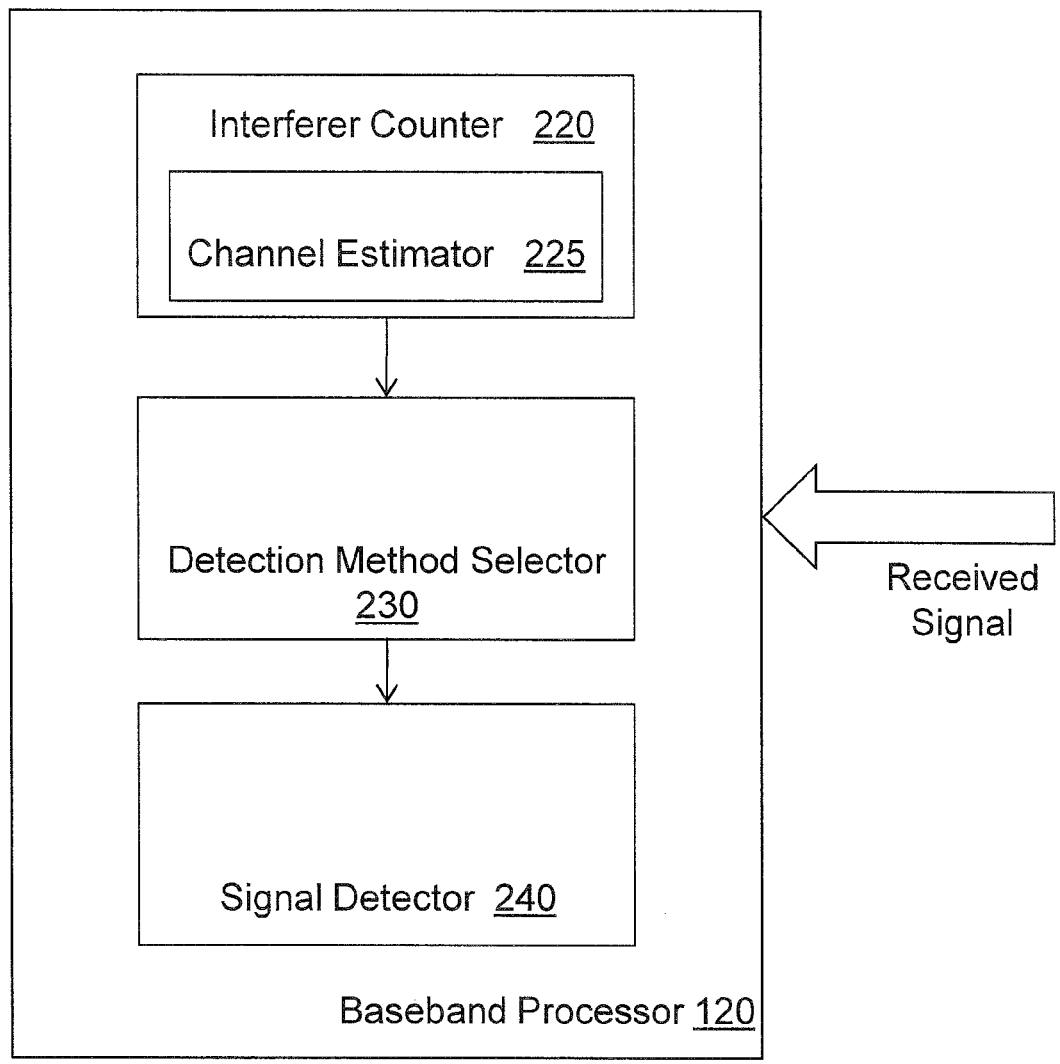
FIG. 2 illustrates one embodiment of an apparatus associated with signal detection with an adjustable number of interfering signals.

Referring now to FIG. 2, a functional block diagram of one embodiment of the baseband processor 120 is shown. A signal from the radio 130 (FIG. 1) is received by baseband processor 120. For the purposes of this description, it is assumed that spatial multiplexing is being performed on the wirelessly transmitted signals and that the received signal includes M signals, including spatial signal streams for the mobile device $U_1$ (referred to as the intended signal) and M−1 interfering signals (M is 3 for the example in FIG. 1, with the number of interfering signals being 2). For the MIMO system shown, each signal includes a number of spatial streams S per signal that is greater than or equal to one. The received signal y can be expressed as:

$$y = H_1 x_1 + H_2 x_2 + \ldots H_M x_M + z$$

where
M: number of user to be detected
$H_i = R \times S_i$ effective channel of user i
R: number of receiver antennas,
$S_i$: number of spatial streams (layers) of user i
$x_i$ (=$S_i \times 1$): transmitted symbol vector for user i
z: circularly symmetric Gaussian noise, $E[zz^H] = \sigma^2 I_R$
The received signal can also be written as:

$$S_{Tot} = \sum_{i=1}^{M} S_i$$

$$y = [H_1 H_2 \ldots H_M][x_1 x_2 \ldots x_M]^T + z$$

$$= Hx + z$$

where $H = [H_1 H_2 \ldots H_M] : R \times S_{Tot}$ matrix $x = [x_1 x_2 \ldots x_M]^T : S_{Tot} \times 1$ vector While the number of streams for the user $S_1$ (the intended signal for mobile device $U_1$) is known, the number of streams for interfering users may not be known by the mobile device.

In some mobile devices, signal detection methods like Maximum Likelihood (ML) detection are performed to isolate the intended signal. In ML, the processor chooses a signal x from the multiple signals in the received signal that minimizes the Euclidean distance (ED) between a given signal (as received on its effective channel) and the received signal:

$$\tilde{x} = \underset{x \in \Omega^S}{\operatorname{argmin}} \|y - Hx\|^2$$

Thus, ML detection, known as a "hard detection" technique, requires an exhaustive distance calculation for each interfering signal in the received signal, making it computationally intense. Other applications of ML detection utilize a "soft demodulation approach" in which simplified versions of ML are employed that reduce the number and complexity of the required computations. All ML detection methods, including sphere decoders, K-Best, M-algorithm, Chase detectors require knowledge of the Modulation Coding Sets (MCS) for the interfering signals, making these techniques unusable when the mobile device does not have MCS information about interfering signals.

Another signal detection technique is Ordered Successive Interference Cancellation (OSIC) in which data symbols in a received signal are cancelled serially in order of decreasing signal to noise ratio (SNR) until only the intended signal remains. One particular OSIC algorithm is zero-forcing (ZF) based. Similar to ML based detection methods, OSIC method cannot be employed in the absence of MCS information for the interfering signals. The following describes a zero-forcing OSIC technique:

Initialization
$G_1 = H^+$: Find pseudo inverse
i=1
Recursion $$k_i = \underset{j \notin \{k_1, \ldots, k_{i-1}\}}{\operatorname{argmin}} \|(G_i)_j\|^2 :$$

Find next symbol to be detected
$W_{k_i}(G_i)_{k_i}$: Find nulling matrix
$\tilde{x}_{k_i} = \operatorname{dec}(W_{k_i}{}^T y_i)$: Interference nulling and slicing
$y_{i+1} = y_i - \tilde{x}_{k_i}(H)_{k_i}$: Interference cancellation
$G_{i+1} = (H_{k_i}{}^-)^+$: Update pseudo inverse
i=i+1
where $(A)_j$ is jth row of A and $H_{k_i}{}^-$ is H with the rows of $k_1, \ldots, k_i$ removed Linear signal detection methods are relatively simple to implement and can be realized without knowledge of MCS information about interfering signals. However, the performance quality of linear signal detection methods depends heavily on accurate information about the number of interfering signals. Two linear detection techniques are Maximal Ratio Combining and MMSE.

Generally, a linear detector can be designed that selects a most likely intended signal based on the following:

$$\tilde{x}_1 = [\tilde{x}_1 \ldots \tilde{x}_{S_1}]^T = dec(\bar{x}_1) = [dec(\tilde{x}_1) \ldots dec(\bar{x}_{S_1})]^T$$

where $dec(\bar{x}) = \underset{x \in \Omega}{\operatorname{argmin}} |x - \bar{x}|$, $\bar{x}_1 = \{Gy\}_{1:S_1} (\{A\}_{p:q} = [a_p a_{p+1} \ldots a_q]^T$ where $A = [a_1 a_2 \ldots]^T)$ The detection method is different according to G:

$$G = \begin{cases} (H^H H + \sigma_n^2 I)^{-1} H^H, & \text{MMSE} \\ H^H (\operatorname{diag}(H^H H))^{-1}, & \text{MRC} \end{cases}$$

Given $S_1=1$, under non-zero interference MMSE (Minimum Mean Squared Error) performs better than MRC. Without interference, MRC is better than or equal to MMSE in performance, depending on the quality of channel estimation. Thus, if it can be determined that there are zero interferers it may be advantageous to select MRC, while selecting MMSE when one or more interferers are present.

Referring to FIG. 2, to effectively employ linear detection methods, the baseband processor includes an interferer counter 220 that counts a number of active interfering signals in the received signal. This number of active interfering signals is provided to a detection method selector 230 that selects a detection method based on the number of active interferers. A signal detector 240 processes the received signal according to the selected detection method to detect the intended signal in the received signal.

Figure 3:
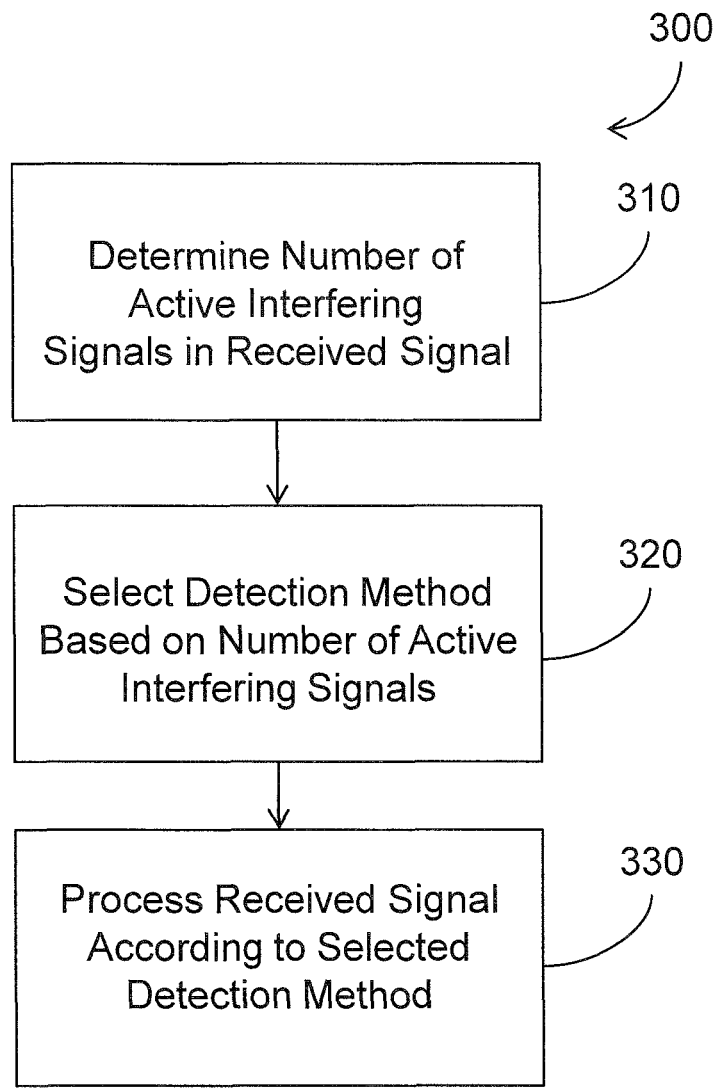
FIG. 3 illustrates one embodiment of a method associated with signal detection with an adjustable number of interfering signals.

FIG. 3 outlines one embodiment of a signal processing method 300 that can be performed by the baseband processor 120. At 310, the number of active interfering signals in a received signal are determined. At 320, a signal detection method is selected based on the number of active number of interfering signals. At 330, the received signal is processed using the selected signal detection method. Thus, it can be said that the baseband processor 120 includes an adaptive signal detector where the number of interfering signals is adjustable.

Referring again to FIG. 2, in one embodiment, the interferer counter 220 includes a channel estimator 225 that estimates the effective channels for the signals within the received signal. The channel estimator 225 may perform channel estimation using known training sequences which are transmitted periodically (e.g., at the start of each frame). A training sequence may include one or more pilot symbols. Orthogonal Frequency-Division Multiplexing communication systems employ designated symbols that include pilot information on the frequency tones (sub frequency bands). The pilot symbol(s) are inserted in front of each transmitted frame. The channel estimator 225 uses the known pilot values to estimate the transmission media characteristics on each of the frequency tones used for data transmission to determine an estimated effective channel for each signal in the received signal, including the intended signal and interfering signals.

Figure 4:
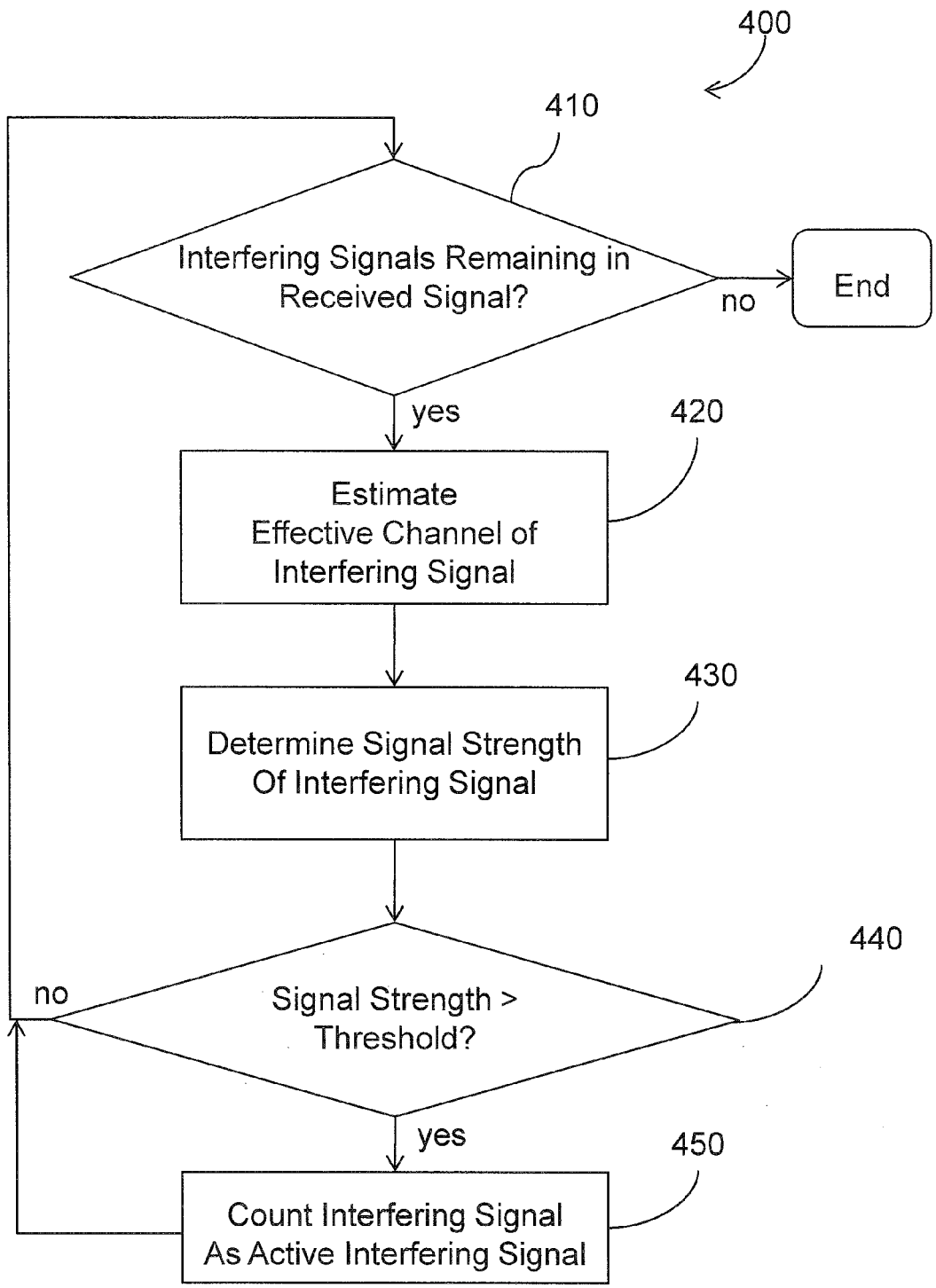
FIG. 4 illustrates one embodiment of a method associated with signal detection with an adjustable number of interfering signals.

Referring now to FIG. 4, one embodiment of a signal processing method 400 that can be employed by the interferer counter 220 is outlines. At 410, the interferer counter determines if there are any signals in the received signal remaining for consideration. If so, at 420, the channel estimator 225 estimates an effective channel for a remaining interfering signal. At 430, the estimated effective channel for an interfering signal is used to determine a signal power for the interfering signal: $E\{\|H_2 x_2\|^2\}$. The signal power is compared to a threshold, such as a noise power of the received signal: $E\{|z|^2\}(=\sigma^2)$. In some embodiments, $E\{\|H_2 x_2\|^2\}$ is compared to $\alpha E\{|z|^2\}$, where $\alpha$ is a predetermined threshold factor. At 440, if the signal power of an interfering signal is greater than the noise power, then at 450 the signal is determined to be an active interfering signal. In this manner, only those interfering signals strong enough to have a significant effect on the detection process are considered. The method 400 is repeated, keeping a count of the number of active signals, until no further signals remain.

The interfering signal detection performed at 440 can use a large variety of thresholds. The threshold can be adaptive and computed online, or prefixed by offline measurements. For example, the threshold can be a scaled noise power as described above, a minimal interfering signal power level, a minimal interfering signal power to noise power ratio, a maximal intended signal power to interfering signal power ratio, and so on.

Returning once again to FIG. 2, the detection method selector 230 uses the number of active interfering signals to process the signal. In general, if the number of active interfering signals is zero, the detection method selector selects a MIMO detection method with an order equal to the number of spatial streams for the intended signal. If the number of active interfering signals is greater than zero, the detection method selector selects a MIMO detection method having an order corresponding to the number of spatial streams for all active interfering signals increased by the number of spatial streams for the intended signal.

In one embodiment in which each signal (both the intended and interfering signals) has one spatial stream (i.e., $S_1, S_2, \ldots S_M=1$), the detection method selector selects a Maximum Ratio Combining detection method if the number of active interfering signals is determined to be zero. This is equivalent to selecting a Minimum Mean Squared Error (MMSE) Detection method with an order equal to the number of spatial streams for the intended signal S1 when the number of active interfering signals is determined to be zero. If the number of active interfering signals is determined to be greater than zero, the detection method selector selects a MMSE detection method having an order corresponding the number of active interfering signals increased by one (the number of spatial streams in the intended signal).

In other embodiments in which the number of spatial streams is larger than 1, the detection method selector selects a MMSE detection method having an order corresponding to the number of spatial streams for all active interfering signals increased by the number of spatial streams for the intended signal.

For example, if the number of active interfering signals is determined to be one, the signal detection method selector 230 will select a second order MMSE technique using $H=[H_1 H_2]$ and $x=[x_1 x_2]^T$ (Equation G, first line). If the number of interfering signals is determined to be zero, a first order MMSE or zero-forcing detection technique is selected, which is equivalent to MRC detection in which $H=[H_1]$ and $x=[x_1]^T$. (Equation G, second line).

Linear signal detection methods and systems have been the focus of the described embodiment. However, the described interfering signal counting technique may be used to provide a count of the number of interfering signals for use with any suitable signal detection technique that performs differently depending on the number of interfering signals. For example Successive Interference signal detection may be performed given the number of interfering signals and MCS information.

DEFINITIONS

The following includes definitions of selected terms employed herein. The definitions include various examples and/or forms of components that fall within the scope of a term and that may be used for implementation. The examples are not intended to be limiting and are to be used in conjunction with ordinary meanings. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements. The interferer counter 220, channel estimator 225 detection method selector 230 and/or the signal detector 240 (see FIG. 2) may be embodied as logics.

While for purposes of simplicity of explanation, illustrated methodologies in the figures are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
an interferer counter configured to identify a number of active interfering signals in a received signal;
a detection method selector configured to:
select a MIMO detection method with an order equal to a number of spatial streams for an intended signal if the number of active interfering signals is zero; and
select a different MIMO detection method having an order corresponding to the number of spatial streams for all active interfering signals increased by the number of spatial streams for the intended signal if the number of active interfering signals is greater than zero; and
a signal detector configured to process the received signal according to the signal detection method selected by the detection method selector to detect an intended signal in the received signal.

2. The apparatus of claim 1, wherein the interferer counter further comprises a channel estimator configured to estimate a channel of an interfering signal in the received signal.

3. The apparatus of claim 1, wherein the interferer counter is configured to identify an interfering signal in the received signal as an active interfering signal when a signal power of the interfering signal exceeds a threshold.

4. The apparatus of claim 1 wherein the detection method selector is configured to select a Minimum Mean Squared Error (MMSE) detection method having an order corresponding the number of active interfering signals increased by one.

5. The apparatus of claim 1, wherein the detection method selector is configured to select a detection method that detects the intended signal independent of a modulation coding set associated with the active interfering signals.

6. The apparatus of claim 1, wherein the detection method selector is configured to select an MMSE detection method having an order corresponding to the number of spatial streams for all active interfering signals increased by the number of spatial streams for the intended signal.

7. The apparatus of claim 1, wherein when the number of active interfering signals is zero, the detection method selector is configured to select a Maximum Ratio Combining (MRC) detection method.

8. The apparatus of claim 3, wherein the threshold comprises one or more of:
    a scaled noise power level;
    a minimal signal power level;
    a minimal signal-to-noise power ratio; and
    a maximal intended signal power to interfering signal power ratio.

9. A method, comprising:
    determining a number of active interfering signals in a received signal;
    select a MIMO detection method with an order equal to a number of spatial streams for an intended signal if the number of active interfering signals is zero; and
    select a different MIMO detection method having an order corresponding to the number of spatial streams for all active interfering signals increased by the number of spatial streams for the intended signal if the number of active interfering signals is greater than zero; and
    processing the received signal with a processor according to the selected detection method to detect an intended signal in the received signal.

10. The method of claim 9, wherein the determining comprises:
    comparing a signal power of an interfering signal in the received signal to a threshold based on the received signal; and
    if the signal power of the interfering signal exceeds the threshold, determining that the interfering signal is an active interfering signal.

11. The method of claim 9, wherein the selecting comprises selecting a detection method that detects the intended signal independent of a modulation coding set associated with the active interfering signals.

12. The method of claim 9, comprising selecting an MMSE detection method having an order corresponding to the number of spatial streams for all active interfering signals increased by the number of spatial streams for the intended signal.

13. The method of claim 9, comprising, when the number of active interfering signals is zero, selecting a Maximum Ratio Combining (MRC) detection method.

14. The method of claim 10, wherein the comparing comprises comparing to a threshold that comprises:
    a scaled noise power level;
    a minimal signal power level;
    a minimal signal-to-noise power ratio; or
    a maximal intended signal power to interfering signal power ratio.

15. A device comprising:
    a transmitter/receiver antenna array configured to receive a plurality of signal spatial streams combined with zero or more interfering signals that together form a received signal; and
    a baseband processor configured to:
        determine a number of active interfering spatial streams based, at least in part, on the received signal;
        select a MIMO detection method with an order equal to the number of spatial streams for an intended signal if the number of active interfering signals is zero; and
        select a different MIMO detection method having an order corresponding to the number of spatial streams for all active interfering signals increased by the number of spatial streams for the intended signal if the number of active interfering signals is greater than zero; and
        process the received signal according to the selected detection method to detect the intended signal in the received signal.

16. The device of claim 15, wherein the baseband processor is configured to:
    estimate an effective channel of one or more interfering signals comprising one or more interfering signal layers;
    determine a signal power of the interfering signal on the effective channel;
    compare the signal power of the interfering signal to a threshold based on the noise power of the received signal; and
    if the signal power of the interfering signal exceeds the threshold, determining that the interfering signal is the active interfering signal.

17. The device of claim 15, wherein the baseband processor is configured to select an MMSE detection method having an order corresponding to the number of spatial streams for all active interfering signals increased by the number of spatial streams for the intended signal.

18. The device of claim 15, wherein when the number of active interfering signals is zero, baseband processor is configured to select a Maximum Ratio Combining (MRC) detection method.

* * * * *

UNITED STATES PATENT AND TRADEMARK OFFICE
CERTIFICATE OF CORRECTION

| | | |
|---|---|---|
| PATENT NO. | : 8,687,750 B1 | Page 1 of 1 |
| APPLICATION NO. | : 13/159931 | |
| DATED | : April 1, 2014 | |
| INVENTOR(S) | : Jungwon Lee, Jinwoong Choi and Yakun Sun | |

It is certified that error appears in the above-identified patent and that said Letters Patent is hereby corrected as shown below:

In the Claims

Column 9, Claim 9, line 26, delete "select" and insert --selecting--

Column 9, Claim 9, line 29, delete "select" and insert --selecting--

Column 10, Claim 16, line 41, delete "the" and insert --an--

Signed and Sealed this
Ninth Day of December, 2014

Michelle K. Lee
*Deputy Director of the United States Patent and Trademark Office*